United States Patent [19]

Tinsley et al.

[11] 4,234,344
[45] Nov. 18, 1980

[54] LIGHTWEIGHT CEMENT AND METHOD OF CEMENTING THEREWITH

[75] Inventors: John M. Tinsley; Larry T. Watters, both of Duncan, Okla.

[73] Assignee: Halliburton Company, Duncan, Okla.

[21] Appl. No.: 40,254

[22] Filed: May 18, 1979

[51] Int. Cl.$^3$ ............................................. C04B 7/02
[52] U.S. Cl. ..................................... 106/88; 106/98
[58] Field of Search ............................. 106/88, 98

[56] References Cited

U.S. PATENT DOCUMENTS

| | | | |
|---|---|---|---|
| 2,597,370 | 5/1952 | Peckman | 106/98 |
| 2,915,301 | 12/1959 | Selden | 106/88 |
| 3,062,669 | 11/1962 | Dilnot | 106/88 |
| 3,360,046 | 12/1967 | Johnson et al. | 106/98 |
| 3,669,700 | 6/1972 | Beach et al. | 106/98 |
| 3,701,671 | 10/1972 | Blengsli | 106/98 |
| 3,867,159 | 2/1975 | Ergene | 106/88 |
| 3,948,672 | 4/1976 | Harnsberger | 106/98 |
| 3,961,973 | 6/1976 | Jones | 106/98 |
| 4,040,852 | 8/1977 | Jones | 106/98 |
| 4,135,940 | 1/1979 | Peltier | 106/98 |

*Primary Examiner*—James Poer
*Attorney, Agent, or Firm*—John H. Tregoning; Robert S. Nisbett; William R. Laney

[57] ABSTRACT

A low-density, high-strength cement composition useful in a high temperature environment, such as in thermal wells, which includes hydraulic cement, a siliceous material and a relatively low-density inorganic material.

38 Claims, No Drawings

LIGHTWEIGHT CEMENT AND METHOD OF CEMENTING THEREWITH

This invention relates to cementing compositions useful in applications where the cement is exposed to a relatively high temperature (above about 300° F.), must be of relatively low density, and must demonstrate good early strength and low strength retrogression. More particularly, the invention relates to high-strength, lightweight cements useful in cementing geothermal wells. This invention also relates to cementing methods utilizing the cement compositions of the invention.

With the increasing interest in geothermal wells as an energy source, the need has also intensified for well cementing compositions which function satisfactorily under the extreme conditions of temperature and pressure encountered in completing and using such wells. The lithological and stratigraphic conditions which are compatible with the subterranean high temperatures characteristic of geothermal well sites also frequently present special problems in cementing a casing or production tubing in a bore hole. Thus, the formations tranversed by geothermal well bores are often found to be weak, incompetent or permeated by extensive and large fractures. For this reason lost circulation and break-out of cement during placement is a frequent concern, and necessitates reducing the density or weight of the cement as must as possible to accordingly reduce the hydrostatic pressure. Thus, in addition to providing a cement which has excellent thermal stability, it is very desirable that the cement be of relatively light weight or low density.

Thermal wells also characteristically (though not always) produce hot, highly corrosive fluid at tremendous rates—many times the usual rate of production from most oil wells. The production is often through a relatively large pipe or casing, and the cement in the annular space between this pipe and the surrounding formation is subjected to high temperature from the fluid contained in the pipe and the corrosive fluid in the formation. It is therefore important that the cement be of relatively low permeability to adequately protect the outer side of the casing from the penetration of the hot corrosive fluid, and also to prevent interzonal communication through the cement.

From these considerations, it will be perceived that a cement which will perform well in the cementing of geothermal wells should be of relatively low density and low permeability, but should have relatively high strength and possess thermal stability which prevents any significant retrogression in strength over extended periods of high temperature exposure. Certain components of cement compositions are known to aid in imparting certain of these properties to well cements. Thus, the use of silica in cements which are to be used in high temperature applications is well known. This additive, however, tends to substantially increase the density or "weight" of the cement.

For the purpose of reducing the density of the cement, water is sometimes added, and in general, the higher the water content, the lighter is the cement. To enable more water to be added to cement as fixed vis-a-vis free water, cement extender materials, such as anhydrous sodium metasilicate, are often added to the slurry mixture. The production of low density cement by the use of high water content, however, is achieved at the expense of early and ultimate strength, and an undesirable increase in permeability.

Other methods have been employed for reducing the density of cement compositions. It has been proposed to add such relatively low density materials as bentonite, diatomaceous earth and perlite. It has also been disclosed that highly cellular, porous or expanded materials having a large void space can be used to lighten both cement slurries and cementitious products. In U.S. Pat. Nos. 3,804,058 and 3,902,911 issued to Messenger, lightweight cements are made by utilizing small, sealed glass or ceramic spheres as a substantial component of the cement compositions. Although the densities of these cements are relatively low, they have relatively high water contents and compressive strengths which generally do not exceed about 600 psi.

The present invention offers a high-strength, low-density cement composition which has excellent thermal properties for use in a high temperature environment, such as that typically encountered in the completion of, and production from, geothermal wells. The cement composition includes a hydraulic cement, water, an inorganic, particulate crystalline siliceous component and a lightweight inorganic material which does not absorb substantial water, and has a density of less than about 1.25 at a pressure of 5000 psi.

The cement thus constituted is stable and strong at high temperatures (in general above 300° F., and up to about 700° F.) and does not appreciably retrogress in strength upon aging, has a relatively low density, relatively low permeability and can be easily pumped after mixing. Preferably, the cement has a 24-hour compressive strength which exceeds about 800 psi after curing at about 500° F. and under 5600 psi. Its permeability to air at ambient conditions is preferably less than 1.0 millidarcy, and its density under cementing conditions is from about 8.5 lbs/gal (for wells shallower than about 2000 feet) to about 13 lbs/gal (for substantially deeper wells).

Two important components of the cement compositions of the invention are the inorganic, particulate crystalline siliceous component and the lightweight inorganic material. The inorganic particulate siliceous component functions to impart thermal stability and permanent strength to the cement. The amount of the particulate crystalline siliceous component used can vary widely, and will depend, of course, upon the specific siliceous component employed, and also upon the temperature to which the cement is exposed during and following placement, and the density of the cement which is desired, among other conditions. In general, however, from about 15 to about 100 percent by weight based on dry cement can be utilized. For the majority of cementing applications, from about 30 to about 60 percent by weight of dry cement will constitute an adequate quantity of the particulate inorganic siliceous component.

The preferred siliceous material is fine, crystalline particulate silica. Silica flour having a particle size of less than 10 mesh is preferably utilized. The most preferred particle size of the silica is such that substantially all of the particles will pass through a 60 mesh screen.

The lightweight inorganic material functions to reduce the ultimate density (or "weight") of the cement without sacrifice in the early strength, or reduction in ultimate strength through strength retrogression at high temperature. In order to function properly, this additive must be relatively temperature stable so as not to soften or decompose at temperatures over about 300° F., must not absorb any significant amount of water so as to thereby reduce the early and ultimate strength of the cement, and must be of relatively low density. In the latter regard, the lightweight inorganic material has a density which is less than 50 percent that of crystalline silica of less than 10 mesh particle size, and is more desirably less than about 1.05 gms/cc at 500 psi pressure.

The types of lightweight inorganic material which can be used include dispersed, stabilized gases having relatively low solubility in water, such as hydrogen, air, oxygen and the noble gases, and particulate, inorganic relatively highly porous siliceous solids. Examples of the latter materials are glass and ceramic microballoons or sealed hollow spheres or beads, and such spheres made of fly ash materials. The size of such spheres or beads is preferably such that at least 65 weight percent of the spheres or beads will pass through a 100 mesh screen. The amount of silicon in these solids can vary widely, as can the other typical components, such as, for example, boron and aluminum, which are found in various types of inorganic siliceous solids. It is further preferred that where particulate, inorganic, relatively highly porous siliceous solids are utilized in the cement composition, such solids do not undergo significant increase in density with increase in pressure. This is desirable, of course, in order that this particular additive continue to effectively function in reducing the density of the slurry composition after the slurry is placed in locations, such as deep walls, where the slurry is subjected to high pressure. Preferably, the particulate inorganic siliceous solids do not undergo an increase in density of more than about 75% as the pressure thereon is increased from 0 psi to 8000 psi. The minimum gas porosity of the particles is preferably at least 50 percent and does not decrease to less than 12.5 percent under in-place cementing conditions.

Where entrained gas is used, the amount employed in the cement composition is from about 0.1 SCF per cubic foot of slurry to about 200 SCF per cubic foot of slurry. The gas can be incorporated in the slurry by mixing it with the other slurry components prior to placing the slurry in the cementing locus, or it can be generated in situ in the slurry by placing a gas source in the slurry when mixing. Such gas sources include, for example, particulate metals which undergo reaction with water or aqueous lime in the slurry to yield a gas. Typical of such powdered metals are aluminum, magnesium, calcium and zinc.

Where highly porous inorganic siliceous solids are used, such as sealed microspheres, an amount ranging from about 10 to about 100 lbs/sack is utilized. Preferably, between 30 and 60 lbs/sack is employed.

With regard to the amounts of the several components of the slurry composition which have been referred to herein, as well as with regard to other terminology utilized in describing the invention, API Bulletin 10-C of the American Petroleum Institute is incorporated herein by reference. This publication sets forth the nomenclature used in oil well cementing technology. Additionally, API Specification 10-A is also incorporated by reference. This publication of the American Petroleum Institute defines certain specifications which are to characterize oil well cements and cement additives.

In addition to the particulate, crystalline siliceous component, and the lightweight inorganic material, the cement slurry is often benefited by the inclusion therein of hydrated lime. Lime appears to enhance both the early strength and ultimate strength of the cement, and, in general, the overall thermal stability of the cement. Its inclusion is particularly desirable where very high temperature usage of the cement is contemplated. It can be suitably utilized in quantities up to about 15 weight percent based on dry cement, with about 1 to about 10 weight percent being preferred.

Since a large amount of water in the cement slurry decreases the strength of the cement on curing, it is also desirable to include a friction-reducing dispersant additive in the cement compositions of the invention. Such materials are well known in the oil well cement technology, and their various properties are thoroughly understood. In the compositions of interest here, such compounds reduce the mixing viscosity of the slurry, and reduce the total water requirement for obtaining the desired pumpability. Typical of such materials are those friction reducer-dispersant compounds described in U.S. Pat. Nos. 3,358,225 and 3,359,225. The amount of dispersant incorporated in the slurry can vary from about 0.1 to about 2.0 weight percent based on dry cement, with about 0.2 to about 0.5 weight percent usually being a suitable quantity.

The principles of the invention are broadly applicable to hydraulic cements, including portland cements, high alumina content cements, pozzolan, high gypsum cements, high silica cements and cements which contain a high calcium aluminate content. Preferably, portland cement is utilized, and can be, for example, one or more of the various types identified as API Classes A–H and J cements. These cements are identified and defined in API Specification 10-A to which reference was earlier made.

The amount of water in the cement ranges from about 4 gals/sack up to about 15.5 gals/sack and generally is best confined to an amount of between 6.0 and 13.0 gals/sack.

A number of other types of additives and modifiers can be added to the cement compositions of the invention, and generally will not be necessarily excluded from use unless incompatible chemically or functionally with the other components hereinbefore described in the attainment of the objectives sought in the cement formulations of the invention. In the latter regard, and as an example of functional incompatibility, any components which tend to greatly weight or increase the density of the cement will, of course, be excluded as counterproductive of the objectives sought. The types of additives which are used to tailor cements to particular circumstances confronted at the cementing situs are generally well known, and include, for example, such materials as set time retarders, dispersing agents, friction reducers, pressurizing agents, fluid loss control additives and lost circulation additives. One or more of these materials can be added to the slurries of this invention to impart properties in addition to, or in enhancement of, those which have previously been described as being of principal importance in the high temperature cementing application of the compositions of the invention.

The following examples illustrate certain aspects of the present invention, particularly with respect to the cement compositions here proposed, and the characteristics of various of the critical additives used in such compositions. In the examples, reference to weight percent will be based on the dry cement unless otherwise indicated. It is also to be understood that reference to the term "sack" refers to a standard sack weighing 94 lbs. as defined in API Bulletin 10-C previously incorporated herein by reference.

EXAMPLE 1

A number of cement slurries made up to a density of 12 lbs/gal. are tested for compressive strength at 505° F. and 5600 psi, conditions typical of a geothermal well. The compositions of the tested slurries are set forth in Table I. The compressive strengths are determined for 3 day, 1 month and 3 month aging periods, using the standard API testing procedure set forth in the publication API RP 10-B (incorporated herein by reference). The air permeability of the cement is also determined, using the standard API testing procedure. The results of these tests, along with the yields of the several slurries, are set forth in Table II.

TABLE I

| | | | Slurry Composition | | | | |
|---|---|---|---|---|---|---|---|
| Slurry | Cement, API Class | Silica, % | Glass Micro-balloons, lbs | Water, gal/sack | Hydrated Lime, % | Dispersant, %[1] | Retarder, %[2] |
| 1 | G | 40 | 70.4 | 11.39 | — | 0.75 | 0.3 |
| 2 | G | 40 | 68.7 | 12.00 | 5 | 0.75 | 0.3 |
| 3 | G | 60 | 78.9 | 12.85 | — | 0.75 | 0.3 |
| 4 | G | 60 | 77.1 | 13.46 | 5 | 0.75 | 0.3 |
| 5 | J | —[3] | 48.3 | 8.91 | — | — | — |
| 6 | J | — | 48.2 | 8.61 | 5 | 0.4 | — |
| 7 | J | 15 | 54.6 | 9.31 | — | 0.4 | — |
| 8 | J | 15 | 51.9 | 9.91 | 5 | 0.4 | — |
| 9 | G[4] | 40 | — | 18.50 | — | — | — |

[1] A commercially available polymerized aromatic sulfonate of the type disclosed in U.S. Pat. Nos. 3,358,225 and 3,359,225 which are incorporated herein by reference.
[2] A commercially available retarder constituted by a blend of calcium lignosulfonate and gluconic acid delta lactone.
[3] API Class J cement inherently and by specification contains between 40 and 60 weight percent silica.
[4] This slurry was made up for comparison purposes and contained 3 weight percent of anhydrous sodium metasilicate.

TABLE II

| | Yield,[2] | Compressive Strength, psi[1] | | | Air Permeability, md |
|---|---|---|---|---|---|
| Slurry | ft³/sack | 3 day | 1 month | 3 month | |
| 1 | 3.31 | 2535 | 1650 | 1195 | 0.75 |
| 2 | 3.40 | 2115 | 1990 | 1820 | 0.47 |
| 3 | 3.75 | 1915 | 1355 | 955 | 0.43 |
| 4 | 3.84 | 2025 | 1545 | 1275 | 0.46 |
| 5 | 2.35 | 1595 | 1455 | 1860 | 0.20 |
| 6 | 2.43 | 1570 | 1460 | 1810 | 0.36 |
| 7 | 2.68 | 1240 | 1390 | — | — |
| 8 | 2.77 | 1560 | 1525 | 1635 | 0.49 |
| 9 | | 490 | — | 550 | 4.82 |

[1] Compressive strength determined after curing at 505° F. and 5600 psi pressure.
[2] Determined at 5600 psi pressure.

EXAMPLE 2

A cement slurry is made up to contain API Class G cement, 40 weight percent silica flour, 5 weight percent hydrated lime, 0.75 percent commercially available friction reducer-dispersant, 12.5 gal/sack of water and 88.4 lbs/sack of glass microballoons. The 24-hour compressive strength of the slurry, as determined at 500° F. and 4000 psi, is 1085 psi. The density and yield of the slurry is measured for several pressure conditions, and the results are set forth in Table III.

TABLE III

| Pressure | Density, lbs/gal | Yield, ft³/sack |
|---|---|---|
| 0 | 9.8 | 4.50 |
| 2000 | 10.4 | 4.23 |
| 4000 | 10.8 | 4.09 |

EXAMPLE 3

To evaluate the manner in which the density of ceramic microballoons or hollow spheres varies with the increase in pressure exerted upon such spheres, tests were conducted in which a quantity of the spheres was subjected to increasing pressures, and the particle densities then measured. The results of these tests are set forth in Table IV.

TABLE IV

| Pressure, psi | Effective Particle Density, gm/cc |
|---|---|
| 0 | 0.658 |
| 100 | 0.748 |
| 200 | 0.755 |
| 400 | 0.763 |
| 800 | 0.791 |
| 1600 | 0.839 |
| 2400 | 0.879 |
| 3200[1] | 0.924 |
| 4000 | 0.969 |
| 4800 | 1.011 |
| 5150[2] | 1.028 |
| 5600 | 1.051 |

[1] Values for pressures above 2400 psi calculated from extrapolated data.
[2] Value for particle density at 5150 psi interpolated from density values at 4800 psi and 5600 psi.

EXAMPLE 4

Nine cement slurries are made up with several types of cement and containing varying quantities of water, ceramic microballoons, and dispersant. The slurries each contain 40 weight percent silica powder and 5 weight percent of hydrated lime. A small amount of hydroxyethyl cellulose (HEC) is added to most of the slurries to slightly viscosify the slurry and thereby aid in suspending the light microballoons. Each of the slurries is subjected to a series of density measurements at varying pressures increasing from 0 psi to 8000 psi. The results of these density measurements are set forth in Table V, along with the compositions of the several slurries tested.

TABLE V

| Slurry | Slurry Composition | | | | | Slurry Weight, lbs/gal, at Pressure, psi | | | | | | | |
|---|---|---|---|---|---|---|---|---|---|---|---|---|---|
| | Cement, API Class | Dispersant, %[1] | HEC, %[2] | H₂O, % | Microballoons, % | 0 | 100 | 400 | 800 | 2500 | 4000 | 6000 | 8000 |
| 1 | G | 0.75 | 0 | 110 | 94 | 10.5 | 10.8 | 10.8 | 10.9 | 11.3 | 11.6 | 11.9 | 12.2 |
| 2 | A | 0.5 | 0.75 | 100 | 50 | 10.3 | 10.4 | 10.5 | 10.6 | 10.9 | 11.1 | N.D. | N.D. |
| 3 | A | 0.5 | 0.40 | 65 | 35 | 11.3 | 11.5 | 11.5 | 11.6 | 11.9 | 12.1 | N.D. | N.D. |
| 4 | A | 0.5 | 0.75 | 100 | 50 | 10.2 | 10.4 | 10.5 | 10.6 | 10.9 | 11.2 | 11.5 | 11.8 |
| 5 | A | 0.5 | 0.75 | 100 | 50 | 10.0 | 10.3 | 10.5 | 10.6 | 11.1 | 11.4 | 11.8 | 12.1 |
| 6 | H | 0.5 | 0.5 | 100 | 35 | 9.6 | 9.3 | 9.6 | 9.8 | 11.2 | 11.7 | 12.3 | 12.6 |
| 7 | H | 0.5 | 0.5 | 100 | 50 | 8.4 | 9.0 | 9.1 | 9.4 | 10.4 | 11.1 | 11.8 | 12.4 |
| 8 | A | 1.0 | 0.75 | 120 | 50 | 8.6 | 8.6 | 8.9 | 9.3 | 10.6 | 11.0 | N.D. | N.D. |
| 9 | A | 0.5 | 0.75 | 100 | 50 | 10.1 | 10.4 | 10.6 | 10.7 | 11.2 | 11.5 | 11.9 | 12.2 |

[1] A commercially available polymerized aromatic sulfonate of the type disclosed in U.S. Pat. Nos. 3,358,225 and 3,359,225 which are incorporated herein by reference.
[2] Hydroxyethyl cellulose.

The density measurements reported in Table V for the nine slurries tested demonstrate that the compositions of the invention can be made up to range in density from about 8.5 lbs/gal at atmospheric pressure up to about 12.5 lbs/gal at 8000 psi.

EXAMPLE 5

In order to compare thermal conductivity of a cement slurry containing hollow glass spheres with that of a perlite-containing slurry, two slurries are made up for testing. Each of these slurries, in addition to the amount of other additives specified in Table VI, contains 0.5 percent of a commercially available friction reducing additive. The thermal conductivity of the samples is determined after curing at 500 psi and 120° F. for seven days, and also after curing for one day at 450+° F. The results of these tests are set forth in Table VI.

EXAMPLE 6

It is of substantial importance in the cementing of geothermal wells that the cement compositions utilized contain minimal free water. For the purpose of evaluating the free water content of a number of cement slurries constituted in accordance with the present invention, and also for observing the thickening times and compressive strengths of such slurries, twelve cement slurries are made up, utilizing API Class G cement mixed with varying amounts of two types of silica particles, various amounts of glass microballoons and varying amounts of dispersant and retarder. The compositions of the several slurries thus constituted are set forth in Table VII.

Each slurry is tested for free water content and thickening time, after subjecting each slurry to a particular

TABLE VI

Thermal Conductivity of Hollow Sphere Cement Slurries

| | Slurry Composition | | | | | | |
|---|---|---|---|---|---|---|---|
| Slurry | Lightweight Additive | Cement | Water gal/sack | Silica Flour | Other | Density | Curing Temp, °F. | K Value,[1] BTu/hr-Ft-°F. |
| 1 | 8 lbs/sack perlite | Class G | 10.95 | 40% | 2% Bentonite | 13.6 | 120° F. | 1.26 |
| | | | | | | | 450 + °F. | 0.43 |
| 2 | 50 lbs/sack ceramic spheres | Ciment[2] Fondu | 11.9 | 65% | | 11.6 | 120° F. | 0.334 |
| | | | | | | | 450 + °F. | 0.197 |

[1] Thermal conductivity (120° F. measurements with wet cement; 450 + °F. measurements with dry cement).
[2] Ciment fondu is a non-portland cement with a high tricalcium aluminate content.

The results of the thermal conductivity measurements indicate that the slurry containing the glass microspheres has a relatively low thermal conductivity, thus making it especially well adapted for use in thermal wells.

simulated bottom hole pressure for a period of 15 minutes. The 24-hour compressive strength of each of the several slurries is also measured. These tests are conducted in accordance with the testing procedures set forth in API Specification 10-A. The results of these determinations are set forth in Table VIII.

TABLE VII

| | Slurry Composition[2] | | | | | |
|---|---|---|---|---|---|---|
| Slurry | Silica, %[1] and Type | Glass Microballoons, lbs/sack | Water, gal/sack | Dispersant, % | Retarder, % | Anhydrous Sodium Metasilicate, % |
| 1 | 40-A | 29.3 | 8.5 | 1.0 | 0.3 | — |
| 2 | 40-B | 34.4 | 8.0 | 0.5 | 0.3 | 0.2 |
| 3 | 80-A | 37.3 | 10.5 | 1.0 | 0.3 | — |
| 4 | 80-B | 41.9 | 10.0 | 0.5 | 0.3 | 0.3 |
| 5 | 100-A | 41.3 | 11.7 | 1.0 | 0.3 | — |
| 6 | 100-B | 45.5 | 11.1 | 0.5 | 0.3 | 0.3 |
| 7 | 40-A | 48.5 | 10.9 | 1.0 | 0.3 | — |
| 8 | 40-B | 53.2 | 10.3 | 1.0 | 0.4 | 0.3 |
| 9 | 80-A | 61.6 | 13.4 | 1.0 | 0.4 | — |
| 10 | 80-B | 66.9 | 12.8 | 1.0 | 0.4 | 0.2 |
| 11 | 100-A | 68.2 | 14.7 | 1.0 | 0.4 | — |

TABLE VII-continued

| Slurry | Silica, %[1] and Type | Glass Microballoons, lbs/sack | Slurry Composition[2] Water, gal/sack | Dispersant, % | Retarder, % | Anhydrous Sodium Metasilicate, % |
|---|---|---|---|---|---|---|
| 12 | 100-B | 74.2 | 14.0 | 0.75 | 0.4 | 0.3 |

[1]Silica A is a fine silica flour (all particles pass a 325 mesh screen); silica B is a particulate silica in which substantially all particles pass a 60 mesh screen and are retained on a 170 mesh screen.
[2]The density of Slurries 1–6 measured at 5600 psi was 13.5 lbs/gal; the density of Slurries 7–12 measured at 5150 psi was 12.5 lbs/gal.

TABLE VIII

| Slurry[1] | Free Water, cc | Thickening Time,[2] Hrs:Min | 24-Hour Compressive Strength at 550° F. and 5600 psi, psi |
|---|---|---|---|
| 1 | 0.8 | 1:30 | 2020 |
| 2 | 1.0 | 0:54 | 2525 |
| 3 | 2.1 | 1:10 | 2215 |
| 4 | 2.5 | 0:58 | 2335 |
| 5 | 0.0 | 1:03 | 1975 |
| 6 | 2.0 | 0:50 | 2045 |
| 7 | 3.0 | 1:16 | 1385 |
| 8 | 0.0 | 1:18 | 795 |
| 9 | 3.0 | 1:27 | 805 |
| 10 | 0.0 | 1:22 | 1025 |
| 11 | 0.2 | 1:12 | 1160 |
| 12 | 0.0 | 1:16 | 1175 |

[1]Slurries 1–6 were subjected to a simulated bottom hole pressure of 5600 psi for 15 minutes before testing for free water and thickening time; in the case of slurries 7–12, the simulated bottom hole pressure was 5150 psi.
[2]In the thickening time tests, the schedule followed was to increase the temperature at a rate of 7°/minute from the initial temperature of 80° F. to a final temperature of 250° F. in 24 minutes.

EXAMPLE 7

In a developmental field test, a steam injection well in Utah is cemented utilizing the cement composition of the invention. The well conditions include 749 feet of 7-inch casing located in 986 feet of 13-⅜ths inch hole. The formation temperature is between 45° and 65° F.

40 sacks of Ciment Fondu formulated in accordance with the present invention are used as the lead-in slurry and 15 sacks of tailing-in slurry comprising 90 lbs. of Ciment Fondu and 58.5 lbs. of silica are utilized. The lead-in slurry is composed of the Ciment Fondu, 55.5 weight percent hollow glass beads, 65 weight percent silica flour, 0.5 weight percent dispersant and 110 weight percent water. This composition has a density, at 1000 psi, of 11.67 lbs/gal and a yield of 3.44 cu.ft./sack. The cementing job is completed successfully.

Although the foregoing description of the invention has dealt with certain preferred cement compositions, it will be understood that variations in both the compositions of the cements, within the broad limits described, as well as in the steps carried out in practicing the process of the invention, can be effected without departure from the basic principles which underlie the invention. Changes in materials used and the steps followed which are of this type are therefore deemed to be within the spirit and scope of the invention except as the same may be necessarily limited by the appended claims and reasonable equivalents thereof.

What is claimed is:

1. In a process for cementing a bore hole intersecting a subterranean formation in which the cementing composition may be at an elevated temperature using an aqueous hydraulic cement slurry, the improvement of adding to the cement slurry to decrease its thermal conductivity, to decrease its density and to provide high strength at the elevated temperature, the components comprising a fine particulate crystalline silica having a particle size of less than about 10 mesh and a lightweight inorganic material which does not absorb a substantial quantity of water and which lowers the density of said slurry to about 8.5–13.0 pounds/gallon under well cementing conditions.

2. The process improvement defined in claim 1 wherein said lightweight inorganic material has a density of less than about 1.05 gms/cc at 60° F. and atmospheric pressure.

3. The process improvement defined in claim 2 wherein said lightweight inorganic material is selected from the group consisting of a stable, dispersed gas, and porous particles of a siliceous inorganic material.

4. The process improvement defined in claim 2 wherein the amount of silica added is between 15 and 100 weight percent, based on cement.

5. The process improvement defined in claim 2 wherein said lightweight inorganic material is a gas having a relatively low solubility in water.

6. The process improvement defined in claim 5 wherein the gas is selected from the group consisting of hydrogen, oxygen, air, nitrogen and the noble gases, and mixtures thereof.

7. The process improvement defined in claim 5 wherein from about 0.1 to about 200 SCF of gas per cubic foot of the slurry is added to the slurry.

8. The process improvement defined in claim 6 wherein said gas is hydrogen gas.

9. The process improvement defined in claim 1 wherein said lightweight inorganic material is a quantity of sealed, hollow rigid beads of silicon-containing material.

10. The process improvement defined in claim 9 wherein the quantity of hollow beads added to the slurry is from about 45 lbs/sack of the dry cement to about 90 lbs/sack of the dry cement.

11. The process improvement defined in claim 1 and further characterized as including the step of adding to the cement slurry up to about 15 weight percent, based on the weight of dry cement, of hydrated lime.

12. The process improvement defined in claim 1 and further characterized as including the step of adding a dispersant to the cement slurry in an amount of from about 0.1 weight percent to about 2.0 weight percent, based on the weight of the dry cement.

13. The process improvement defined in claim 2 and further characterized as including the step of adding to the slurry a material selected from the group consisting of a set time retarding compound, a dispersant, a set time accelerator compound, a fluid loss control additive, a pressurizing additive or a combination thereof.

14. The process improvement defined in claim 5 wherein gas is added to the slurry by generating the gas in situ by reacting a solid additive to the slurry with one or more components of the slurry to produce gas.

15. The process improvement defined in claim 4 wherein said lightweight inorganic material is from about 45 lbs/sack of the dry cement to about 90 lbs/sack of the dry cement of hollow rigid beads of a silica-containing material.

16. The process improvement defined in claim 15 wherein substantially all of the particles of silica will pass through a 60 mesh screen.

17. The process improvement defined in claim 16 and further characterized as including the step of adding a dispersant to the cement slurry in an amount of from about 0.1 weight percent to about 2.0 weight percent, based on the weight of the dry cement.

18. The process improvement defined in claim 17 and further characterized as including the step of adding to the cement slurry from about 1.0 weight percent to about 10 weight percent, based on dry cement, of hydrated lime.

19. A high-strength, low density thermally stable hydraulic cement composition comprising an aqueous slurry of hydraulic cement containing fine particulate, crystalline silica having a particle size of less than about 10 mesh and a lightweight inorganic material which does not absorb a substantial quantity of water, which is compatible with the components of the cement slurry and which has a density which is less than 50 percent of the density of the particulate, crystalline silica wherein said lightweight material lowers the density of said slurry to about 8.5–13.0 pounds/gallon under well cementing conditions.

20. A hydraulic cement composition as defined in claim 19 wherein the lightweight inorganic material is a material selected from the group consisting of hollow glass beads, hollow ceramic beads and an inorganic gas or a combination thereof.

21. A hydraulic cement composition as defined in claim 19 further characterized in containing one or more additives selected from the group which includes a retarder, a dispersant, a fluid loss control agent, an accelerator and a pressurizing agent.

22. A hydraulic cement composition as defined in claim 19 wherein said slurry contains from about 15 weight percent to about 100 weight percent, based on dry cement, of the particulate crystalline silica.

23. A hydraulic cement composition as defined in claim 19 wherein said lightweight inorganic material is hollow sealed microballoons of a silica-containing material.

24. A hydraulic cement composition as defined in claim 23 wherein said slurry contains from about 45 lbs/sack of the dry hydraulic cement to about 90 lbs/sack of the dry hydraulic cement of said sealed microballoons.

25. A hydraulic cement composition as defined in claim 19 wherein said lightweight inorganic material is a solid, particulate, porous material containing silica, and having the property of undergoing an increase in density of not more than 75% in being subjected to an increase in pressure of from 0 psi to 8000 psi.

26. A hydraulic cement composition as defined in claim 19 wherein said lightweight inorganic material is a gas selected from the group consisting of air, hydrogen, oxygen, nitrogen and the noble gases and mixtures thereof.

27. A hydraulic cement composition as defined in claim 24 wherein said slurry is further characterized in including from about 1 to about 15 weight percent, based on dry cement, of hydrated lime.

28. A hydraulic cement composition as defined in claim 26 wherein said gas is present in an amount of from about 0.1 SCF to about 200 SCF per cubic foot of slurry.

29. A hydraulic cement composition as defined in claim 24 wherein said slurry contains from about 15 weight percent to about 100 weight percent based on dry cement, of the particulate crystalline silica.

30. A hydraulic cement composition as defined in claim 29 wherein said crystalline silica particle size is less than 60 mesh.

31. A hydraulic cement composition as defined in claim 30 wherein said microballoons are glass.

32. A hydraulic cement composition as defined in claim 30 wherein said microballoons are ceramic.

33. A hydraulic cement composition as defined in claim 30 wherein said slurry is further characterized in including from about 1 weight percent to 15 weight percent, based on the dry hydraulic cement, of hydrated lime.

34. A pumpable cement composition which contains portland cement, silica, lightweight sealed spheres of siliceous material, and water mixed to yield cement having a 24-hour compressive strength, after curing at 500° F. and 5600 psi, which exceeds 800 psi, a permeability less than 1 millidarcy, and a density of from 8.5 to 13 pounds/gallon under well cementing conditions.

35. A pumpable cement composition as defined in claim 34 wherein the cement composition further contains from about 0.1 weight percent to about 2.0 weight percent, based on the dry cement, of a dispersant.

36. A pumpable cement composition as defined in claim 34 wherein the cement composition further contains from about 1 to about 15 weight percent, based on the dry portland cement, of hydrated lime.

37. In an aqueous hydraulic cement slurry, the improvement of adding to said slurry to produce a thermally stable cement which has low density and good early and ultimate compressive strength at high temperatures a quantity of sealed, impermeable hollow beads of siliceous material adequate to lower the density of the slurry to about 8.5–13.0 pounds/gallon under well cementing conditions wherein said beads do not undergo significant increase in density with increase in pressure.

38. An aqueous hydraulic cement slurry of claim 37 which contains a dispersant additive to improve the pumpability of the slurry without addition of water.

* * * * *